United States Patent
Tsuto et al.

(10) Patent No.: US 10,533,140 B2
(45) Date of Patent: Jan. 14, 2020

(54) METHOD FOR PRODUCING HYDROCARBON LIQUID FUEL

(71) Applicant: REVO INTERNATIONAL INC., Kyoto-shi, Kyoto (JP)

(72) Inventors: Keiichi Tsuto, Itami (JP); Yuichiro Azuma, Uji (JP); Daisaku Shojo, Kyoto (JP)

(73) Assignee: REVO INTERNATIONAL INC., Kyoto-Shi (JP)

( * ) Notice: Subject to any disclaimer, the term of this patent is extended or adjusted under 35 U.S.C. 154(b) by 0 days.

(21) Appl. No.: 16/306,441

(22) PCT Filed: Jan. 31, 2017

(86) PCT No.: PCT/JP2017/003407
§ 371 (c)(1),
(2) Date: Nov. 30, 2018

(87) PCT Pub. No.: WO2017/208497
PCT Pub. Date: Dec. 7, 2017

(65) Prior Publication Data
US 2019/0185758 A1 Jun. 20, 2019

(30) Foreign Application Priority Data

Jun. 1, 2016 (JP) .................................. 2016-110277

(51) Int. Cl.
| | | |
|---|---|---|
| *B01J 37/00* | (2006.01) | |
| *C10G 3/00* | (2006.01) | |
| *B01J 37/16* | (2006.01) | |
| *B01J 37/04* | (2006.01) | |
| *B01J 37/10* | (2006.01) | |
| *B01J 37/20* | (2006.01) | |
| *C10G 47/18* | (2006.01) | |
| *B01J 29/068* | (2006.01) | |
| *B01J 29/072* | (2006.01) | |

(52) U.S. Cl.
CPC ............... *C10G 3/49* (2013.01); *B01J 37/04* (2013.01); *B01J 37/10* (2013.01); *B01J 37/16* (2013.01); *B01J 37/20* (2013.01); *C10G 3/45* (2013.01); *C10G 3/47* (2013.01); *C10G 3/50* (2013.01); *C10G 47/18* (2013.01); *B01J 29/068* (2013.01); *B01J 29/072* (2013.01); *C10G 2300/1014* (2013.01); *C10G 2300/4012* (2013.01); *C10G 2300/4018* (2013.01); *C10G 2300/70* (2013.01)

(58) Field of Classification Search
CPC ........ B01J 29/068; B01J 29/072; B01J 29/14; B01J 37/04; B01J 37/10; B01J 37/16; B01J 37/20; C10G 2300/1014; C10G 2300/4012; C10G 2300/4018; C10G 2300/70; C10G 3/00; C10G 3/45; C10G 3/47; C10G 3/49; C10G 3/50; C10G 47/12; C10G 47/18
See application file for complete search history.

(56) References Cited

U.S. PATENT DOCUMENTS

| | | | | |
|---|---|---|---|---|
| 6,365,542 | B1 * | 4/2002 | Yu | ............................. B01J 37/20 |
| | | | | 502/155 |
| 9,187,702 | B2 * | 11/2015 | Zhan | ..................... B01J 35/1066 |
| 2011/0000824 | A1 | 1/2011 | Zhan et al. | |
| 2014/0357924 | A1 | 12/2014 | Asoaka et al. | |

FOREIGN PATENT DOCUMENTS

| | | |
|---|---|---|
| JP | 2011-148909 A | 8/2011 |
| JP | 2012-532212 A | 12/2012 |
| WO | 2013/073528 A1 | 5/2013 |

OTHER PUBLICATIONS

International Search Report (form PCT/ISA/210) dated Feb. 28, 2017, for International Application No. PCT/JP2017/003407.
Kikuchi et al., "New Catalyst Chemistry", 2nd Edition, 1997, pp. 40-51 (7 pages total).
Koyama et al., "Vegetable Oil Hydrogenating Process for Automotive Fuel", SAE Technical Paper, 2007, 1 page, abstract provided only.
Liu et al., "Production of Bio-Hydrogenated Diesel (BHD) from Vegetable Oils", 6th New Energy Symposium, Mar. 11, 2011, 3 pages total.

* cited by examiner

*Primary Examiner* — Sharon Pregler
(74) *Attorney, Agent, or Firm* — Birch, Stewart, Kolasch & Birch, LLP

(57) ABSTRACT

A method for producing a hydrocarbon liquid fuel including hydrocracking a raw material oil in the presence of a hydrocracking catalyst, at a supplying pressure of hydrogen of from 0.1 to 1.0 MPa, a liquid space velocity of liquid volume of the raw material oil of from 0.05 to 10.0 $hr^{-1}$, and a flow rate of the hydrogen from 50 to 3,000 NL per 1 L of the raw material oil, wherein the hydrocracking catalyst is produced by a method including stirring a sulfur compound and a cracking catalyst in an aqueous medium to allow liquid-solid separation (step 1); stirring a solid product obtained in the step 1 and a metal component in an aqueous medium to allow liquid-solid separation (step 2); baking a solid product obtained in the step 2 (step 3); and reducing a solid product obtained in the step 3, or reducing a solid product obtained in the step 3, and then subjecting a reduced product to sulfurization treatment (step 4). According to the present invention, the hydrocracking of a raw material oil such as fats and oils and biomass retort oils, or a hydrocarbon or the like in petroleum oils, in a given composition can be accomplished by supplying a low-pressure hydrogen of a normal pressure or so.

6 Claims, 4 Drawing Sheets

METHOD FOR PRODUCING HYDROCARBON LIQUID FUEL

TECHNICAL FIELD

The present invention relates to a hydrocarbon liquid fuel which is excellent as a liquid fuel having low-temperature flowability, anti-oxidant property or the like, obtainable by hydrocracking a raw material oil, for example, fats and oils and biomass retort oils, or a hydrocarbon or the like in a petroleum oil, a method for producing the hydrocarbon liquid fuel, and an apparatus for producing the hydrocarbon liquid fuel.

BACKGROUND ART

It has been remarked to produce hydrocarbons from biomass, and has been desired to provide them as liquid fuels, from the viewpoint of being reproducible, and reducing the amount of carbon dioxide discharged by carbon neutralization.

Presently, as fuels using biomass as a raw material, methyl esters of fatty acids are practically used as diesel fuels. However, the methyl esters of fatty acids produce about 10% of glycerol, a raw material of fats and oils as a by-product, and complete removal of this glycerol is difficult, so that the quality of the fuels is lowered. Also, the methyl esters of fatty acids are disadvantageous in that viscosities are large, from the viewpoint of low-temperature flowability. In addition, the methyl esters of fatty acids have an unsaturated bonding group in a carbon chain, so that the oxidation stability is poor. As described above, the methyl esters of fatty acids are yet disadvantageous in quality.

As hydrocarbon liquid fuels of the next generations, a biomass raw material oil is reacted with hydrogen under high temperatures and high pressures in the presence of a catalyst, to form a hydrocarbon from an alkyl chain of the fats and oils has been considered. However, it is limited to the techniques for production of petroleum fuels that are practiced, in other words, the high-temperature, high-pressure hydrocracking techniques (Patent Publication 1 and Non-Patent Publication 1). According to these publications, high pressures of from 2 to 5 MPa are required, and it can be assumed that the reaction hardly progresses at a normal pressure, so that experimental results at a normal pressure are not given. In Patent Publication 1, it is recommended that a preferred pressure is from 1 to 5 MPa. The studies of the fields to be especially referred is Non-Patent Publication 1, in which experimentations are conducted in which a catalyst Ni or Mo is supported to silica or alumina, a raw material fat or oil is Jatropha oil, and a pressurization fixed bed reaction apparatus (1 to 8 Mpa) is used, but any experimental results at a normal pressure are not given.

Besides the above, it is considered that a fat or oil is gasified, and a hydrocarbon is produced from the gas via Fischer-Tropsch synthesis. These can be referred in the same manner as the steps in the case of the petroleum raw material, which is a high-temperature, high-pressure technique.

The method of hydrocracking a fat or oil in the above publications includes saturating an unsaturated binding group of a fat or oil by hydrogenation to remove oxygen, and at the same time cracking a triglyceride of a fat or oil. In the hydrodeoxygenation reaction, a paraffin-based hydrocarbon, water, propane, or the like is produced from triglyceride and hydrogen in the presence of a catalyst by hydrogenation dehydration reaction, decarbonylation reaction, and decarboxylation reaction, under high temperatures and high pressures.

For example, it is disclosed that using a desulfurization and hydrogenation catalyst as a catalyst and a purified palm oil as a fat or oil, palm oil is cracked at a reaction pressure of 6 MPa and a reaction temperature of 260° C. or higher, to produce 85% or so of a gas oil fraction, 10% of water, and 5% of gas (carbon dioxide, methane, propane). The reaction product obtained is constituted by a linear hydrocarbon having 15 carbon atoms to 18 carbon atoms, having physical properties nearing a gas oil (Non-Patent Publication 2). However, since the N-paraffin is the main component, there is a disadvantage in low-temperature flowability, and the product does not sufficiently satisfy other properties as fuels.

On the other hand, the hydrocracking technique to a hydrocarbon in a petroleum oil is nearly in a realm of perfection and well known to be practiced. According to a text book (Non-Patent Publication 3), a catalyst in which a precious metal such as platinum is added to a zeolite-based solid acid catalyst is used as a cracking catalyst, and naphtha, kerosene, gas oil, or the like is produced in a reaction under high-temperature, high-pressure conditions. During the reaction, besides the cracking of the hydrocarbon chain, cyclized dehydrogenation, dehydrogenation, or isomerization takes place, so that physical properties required for fuels such as calorimetric amount, octane number, and cetane number are given. By the addition of platinum to the catalyst, the carbon formation on the catalyst caused by hydrogen deficiency in various reactions mentioned above is suppressed by high-pressure hydrogen, which makes the life of the catalyst practically durable. However, the perfect carbon formation is not suppressed, so that the life of the catalyst is limited. The developments of the catalyst with longer lives are even more desired.

PRIOR ART REFERENCES

Patent Publications

Patent Publication 1: JP-A-2011-148909

Non-Patent Publications

Non-Patent Publication 1: Dai-6-Kai Shin Enerugii Shinpoziumu (6th New Energy Symposium) (Mar. 11, 2011) "Shokubutsu-yu karano Baio-Keiyu (BHD) no Seizo (*Production of Bio-Hydrogenated Diesel (BHD) from Vegetable Oils*)," (Independent Administrative Agency) the National Institute of Advanced Industrial and Technology (AIST), LIU, MURATA, INABA, TAKAHARA Non-Patent Publication 2: Koyama et al., "Jidosha-Nenryo notameno Shokubutsuyu no Suisoka Shori Kotei (*Hydrogenation Treatment Process of Vegetable Oils for Automobile Fuels*)" SAE paper, No. 2007-01-2030(2007) 1-6

Non-Patent Publication 3: "Atarashii Shokubai Kagaku (*New Catalyst Chemistry*) 2nd edition," Kikuchi et al., Sankyo Shuppan, 1997

SUMMARY OF THE INVENTION

Problems to be Solved by the Invention

Accordingly, an object of the present invention is to provide a liquid fuel produced by hydrocracking a raw material oil such as fats and oils and biomass retort oils, or a hydrocarbon or the like in petroleum oils, thereby having low-temperature flowability and oxidation stability and having fuel efficiency, ignition stability and the like as a fuel that are equivalent to kerosene or a gas oil, and a method for producing the same. Another object of the present invention is to economically advantageously provide an apparatus for producing the same. Still another object of the present invention is to provide a catalyst in which a liquid fuel can be produced even when a hydrogen gas is supplied at a supplying pressure lower than that of the conventional, a production method using the catalyst and a production apparatus using the catalyst.

Means to Solve the Problems

As a result of intensive studies in order to solve the above problems, the present inventors have found that raw materials of various hydrocarbon liquid fuels are subjected to hydrocracking in the presence of a newly devised catalyst at a normal pressure or a low pressure of 1.0 MPa or less, whereby a liquid fuel equivalent to kerosene or a gas oil can be economically advantageously produced, and the present invention has been perfected thereby.

Specifically, the gist of the present invention relates to:
[1] a method for producing a hydrocarbon liquid fuel including hydrocracking a raw material oil in the presence of a hydrocracking catalyst,
at a supplying pressure of hydrogen of from 0.1 to 1.0 MPa,
a liquid space velocity of liquid volume of the raw material oil of from 0.05 to 10.0 $hr^{-1}$, and
a ratio of a flow rate of the hydrogen to a flow rate of the raw material oil of from 50 to 3,000 NL of the hydrogen per 1 L of the raw material oil,
wherein the hydrocracking catalyst is produced by a method including
stirring one or more sulfur compounds selected from the group consisting of thiourea, N,N'-diethylthiourea, and thioacetamide, and a cracking catalyst in an aqueous medium to allow liquid-solid separation (step 1);
stirring a solid product obtained in the step 1 and at least one metal component in an aqueous medium to allow liquid-solid separation (step 2);
baking a solid product obtained in the step 2 (step 3); and
reducing a solid product obtained in the step 3, or reducing a solid product obtained in the step 3, and then subjecting a reduced product to sulfurization treatment (step 4);
[2] a hydrocarbon liquid fuel produced by a method for producing a hydrocarbon liquid fuel as defined in the above [1]; and
[3] an apparatus for producing a hydrocarbon liquid fuel including hydrocracking a raw material oil, including at least raw material oil and hydrogen gas feeding members, a reaction member, and a reaction product collecting member,
wherein in the reaction member is present a hydrocracking catalyst produced by a method including:
stirring one or more sulfur compounds selected from the group consisting of thiourea, N,N'-diethylthiourea, and thioacetamide, and a cracking catalyst in an aqueous medium to allow liquid-solid separation (step 1);
stirring a solid product obtained in the step 1 and at least one metal component in an aqueous medium to allow liquid-solid separation (step 2);
baking a solid product obtained in the step 2 (step 3); and
reducing a solid product obtained in the step 3, or reducing a solid product obtained in the step 3, and then subjecting a reduced product to sulfurization treatment (step 4).

Effects of the Invention

According to the present invention, the hydrocracking of a raw material oil such as fats and oils and biomass retort oils, or a hydrocarbon in petroleum oils, in a given composition can be accomplished by supplying a low-pressure hydrogen of a normal pressure or so. The hydrocarbon liquid fuel obtained by the method is a product equivalent to kerosene and a gas oil, and the fuel can be economically advantageously produced according to the present invention.

MODES FOR CARRYING OUT THE INVENTION

Figure 1:
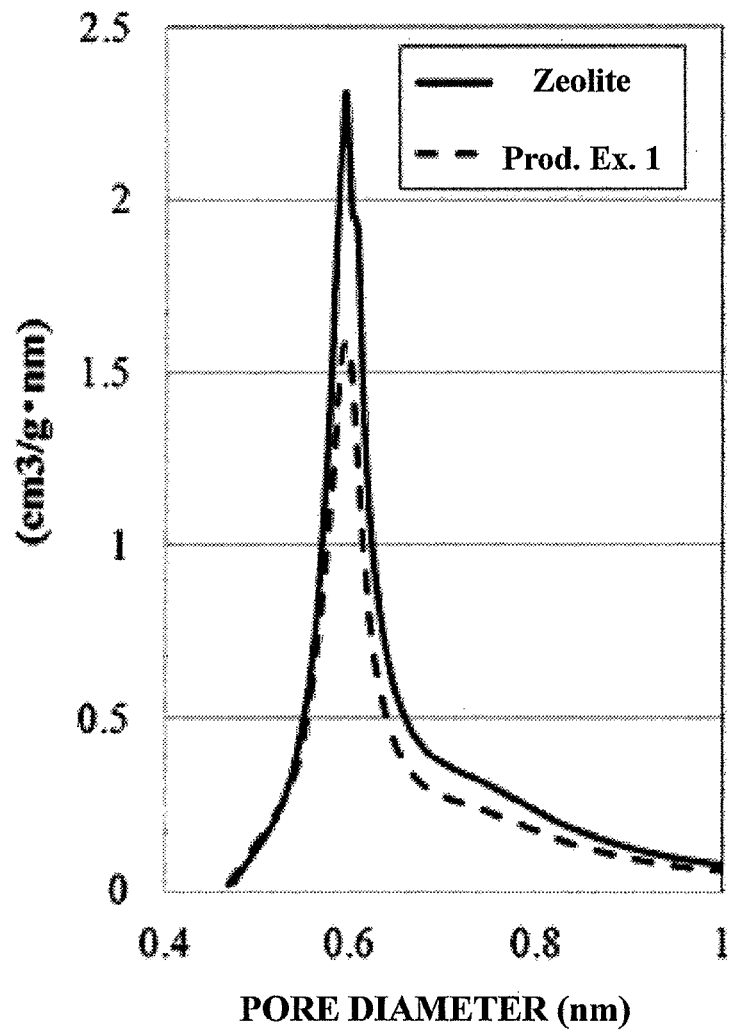
FIG. 1 is a graph showing the distributions of pores of Catalyst A and zeolite.

1. Method for Producing Hydrocarbon Liquid Fuel
The method for producing a hydrocarbon liquid fuel of the present invention includes hydrocracking a raw material oil in the presence of a hydrocracking catalyst,
at a supplying pressure of hydrogen of from 0.1 to 1.0 MPa,
a liquid space velocity of liquid volume of the raw material oil of from 0.05 to 10.0 $hr^{-1}$, and
a ratio of a flow rate of the hydrogen to a flow rate of the raw material oil of from 50 to 3,000 NL of the hydrogen per 1 L of the raw material oil,
wherein the hydrocracking catalyst is produced by a method including
stirring one or more sulfur compounds selected from the group consisting of thiourea, N,N'-diethylthiourea, and thioacetamide, and a cracking catalyst in an aqueous medium to allow liquid-solid separation (step 1);
stirring a solid product obtained in the step 1 and at least one metal component in an aqueous medium to allow liquid-solid separation (step 2);
baking a solid product obtained in the step 2 (step 3); and
reducing a solid product obtained in the step 3, or reducing a solid product obtained in the step 3, and then subjecting a reduced product to a sulfurization treatment (step 4).

The raw material oil in the present invention is preferably, but not limited to, one or more members selected from fats and oils such as rapeseed oil, cottonseed oil, palm oil, coconut oil, sunflower oil, soybean oil, rice oil, oil palm oil, coconut oil, Jatropha oil, and olive oil, and further fats and oils from algae and animal oils are also preferred. In addition, consumed waste cooking oils for tempura oil are more preferred currently. Dark oils obtained from working process of fats and oils, and further animal oils are also utilizable. The biomass retort oil is made from a waste wood such as a pruned material as a raw material, and included in the raw material oil in the present invention. The hydrocarbons in the petroleum oil are also included in the raw material oil in the present invention, and the raw material oils include gas oils and components having the number of carbon atoms larger than the gas oils, and various waste oils. The raw material oil may be constituted by a single kind, or constituted by plural kinds.

One example of the reaction procedures during the production of a hydrocarbon liquid fuel will be explained. In the present invention, a produced oil is obtained by allowing a raw material oil to pass through a catalyst layer filled with a specified catalyst together with hydrogen under given reaction conditions.

The supplying pressure of hydrogen during processing is from 0.1 to 1.0 MPa, preferably 0.8 MPa or less, and more preferably from 0.1 to 0.5 MPa. Since the high-pressure gas equipment would be subject to regulation under the ordinance at a pressure exceeding 1.0 MPa, the pressure is not economically desirable. More preferably, the pressure is a pressure that can hold a given hydrogen flow rate that measures up a normal pressure or a pressure loss of a production apparatus. When the supplying pressure of hydrogen does not satisfy the above lower limit, there is a tendency that the reactivity is lowered, or that the activity is rapidly lowered.

Here, in a case of a low-pressure hydrogen, the hydrogenation is preferred because a carbide precursor (a carbon polymer of an early stage) is likely to be generated under hydrogen deficiency. Since in the hydrogenation a hydrogen pressurization system is thermodynamically advantageous, high-pressure hydrogen is significant. However, in consideration of the matter that it is possible to perform hydrogenation of an ordinary fat or oil (saturation of a double bond group) at 0.2 to 0.8 Mpa, the hydrogenation of a carbide precursor can be carried out at a low-pressure hydrogen of 0.8 Mpa or so at the highest.

The flow rate of the raw material oil is set at a given value. Specifically, the flow rate of the above raw material oil is set at a liquid space velocity of from 0.05 to 10.0 $hr^{-1}$, preferably from 0.1 to 5.0 $hr^{-1}$, and more preferably from 1 to 2 $hr^{-1}$. In the present invention, the lower the liquid space velocity, the more advantageous the reaction. When the liquid space velocity is less than the lower limit mentioned above, a reaction vessel with a very large inner volume would be necessitated, so that excessive facility investments would likely to be needed. On the other hand, when the liquid space velocity exceeds the above upper limit, the reaction is unlikely to sufficiently progress.

The ratio of the hydrogen flow rate to the raw material oil flow rate is set at from 50 to 3,000 NL (normal liters) of the hydrogen per 1 L of the raw material oil, and preferably from 100 to 2,000 NL of the hydrogen per 1 L of the raw material oil. When the ratio of the hydrogen to the raw material oil does not satisfy the above lower limit, there are some tendencies that the reactivity is lowered, and that the activity is rapidly lowered. On the other hand, when the ratio exceeds the above upper limit, excessive facility investments for a hydrogen supplier or the like are likely to be needed.

It is preferable that the hydrocracking catalyst is filled in a reaction vessel such as a known reaction tube. As the form of the reaction vessel, a fixed bed method can be employed. Hydrogen can be employed in either of a countercurrent or cocurrent form against the raw material oil. In addition, a form in which countercurrent and cocurrent forms are combined may be employed using a plurality of reaction vessels. A general form is a down flow form, and a cocurrent gas-liquid form can be employed. Also, the reaction vessels may be used alone or in a combination in a plurality, and a structure in which an internal of one reaction vessel is zoned into plural catalyst beds may be employed.

The reaction temperature, in other words, the temperature at which the above raw material oil and the hydrogen are held is preferably from 200° to 500° C. When the reaction temperature is lower than 200° C., a desired reaction is not likely to progress depending upon the kinds of the raw materials in some cases, and when the reaction temperature exceeds 500° C., there are some tendencies that the carbon formation of the raw material oil progresses, thereby making the life of the catalyst shorter. The reaction temperature is more preferably from 250° to 500° C., and even more preferably from 300° to 450° C.

The component hydrocracked in the reaction vessel can be subjected to, for example, a gas-liquid separating step, a rectifying step, or the like, whereby a hydrocarbon liquid fuel containing a given fraction can be fractionated. By the treatment, a hydrocarbon liquid fuel equivalent to a gas oil or kerosene can be produced. Here, with the reaction of the oxygen component and the sulfur component contained in the raw material oil, there is a possibility of generating water, carbon monoxide, carbon dioxide, hydrogen sulfide, or the like. However, these components can be removed by setting up a gas-liquid separation facility and other device for removing by-product gases between the plurality of reaction vessels, and in the formed product collecting step.

As such, the hydrogen liquid fuel equivalent to a gas oil or kerosene can be produced.

2. Hydrocracking Catalyst

The method for producing a hydrocarbon liquid fuel of the present invention is accomplished by reacting a raw material oil, for example, fats and oils, and biomass retort oils, or a hydrocarbon in petroleum oils, with a low-pressure hydrogen gas, in the presence of a hydrocracking catalyst. The catalyst can be produced by, for example, the following method, specifically, a method including:

stirring a sulfur compound and a cracking catalyst in an aqueous medium to allow liquid-solid separation (step 1);

stirring a solid product obtained in the step 1 and at least one metal component in an aqueous medium to allow liquid-solid separation (step 2);

baking a solid product obtained in the step 2 (step 3); and reducing a solid product obtained in the step 3, or reducing a solid product obtained in the step 3, and then subjecting a reduced product to a sulfurization treatment (step 4).

It is industrially preferably recommended that the preparation of the catalyst of the step 1 to the step 4 is carried out by an in-situ method, including, for example, previously filling a reaction tube with zeolite, sequentially repeating the treatments of the step 1 to step 4 while circulating and contacting with a preparation liquid, thereafter removing the liquid, and subjecting to a gas contact such as heat treatment.

In the step 1, a sulfur compound and a cracking catalyst are stirred in an aqueous medium to allow a liquid-solid separation.

For example, to 100 g of a distilled water are applied a cracking catalyst in an amount of preferably from 5 to 30 g, and more preferably from 10 to 20 g, and a sulfur compound in an amount of preferably from 3 to 15 g, and more preferably from 5 to 10 g, and these components are stirred at an ambient temperature (for example, from 15° to 25° C.). The stirring time is preferably from 6 to 24 hours, and more preferably from 12 to 24 hours. Next, a liquid-solid separation is carried out by a conventional method to collect a solid product. During the liquid-solid separation, a solid product may be washed with water plural times.

The cracking catalyst in the present invention is, but not limited to, preferably a solid acid that functions as a catalyst carrier, and one or more solid acids selected from the group consisting of silica, silica-alumina, zeolite, silica-zirconia, alumina-zirconia, and titania are recommended as more preferred ones. Zeolite refers to an aluminosilicate having pores in the crystals, and Y-type zeolite, X-type zeolite, ZSM zeolite, and the like are preferred. Among them, the Y-type zeolite is more preferred in the present invention because the pore size of the zeolite is largest, and larger molecules intended to be cracked are likely to be penetrated, and thereby the internal of the pores can be effectively used.

The particle size of these solid acids is preferably from 0.01 to 3.0 mm, and more preferably from 0.03 to 3.0 mm. When the particle size is smaller than 0.01 mm, it is not undesirable because the pressure loss of the catalyst layer becomes excessive, and the amount of scattered catalyst is likely to increase. On the other hand, when the particle size is larger than 3 mm, a space is formed between the catalysts, so that fats and oils can pass therethrough; however, the larger particles are undesirable because the surface area per unit volume is small, thereby worsening the contact efficiency. In the case of industrial applications, the catalyst having particle sizes of from 0.5 to 3 mm is more preferably employed, from the viewpoint of handling the catalyst particles.

The triglyceride site of the fat or oil is cracked by a decarbonylation reaction, a decarboxylation reaction, a hydrogenation dehydration reaction with an alkali catalyst and a metal hydride catalyst in the presence of a hydrogen gas. The reactions required in improvements of fuels to kerosene or a gas oil, such as cracking to form low-molecular weight components, a dehydrogenation reaction, an isomerization reaction, a cyclization reaction or the like, due to the cleavages of carbon chains progresses with carbenium ions produced by Brønsted acid sites of the solid acid (the above Non-Patent Publication 3). Therefore, in order to satisfy the above two points, the solid acid is functioned as a support for a metal catalyst, and the supporting of a metal catalyst is the necessary requirements for meeting various reactions mentioned above. Therefore, the catalyst support is a solid acid, and silica-alumina and zeolite each having basic sites of alumina are preferred.

Zeolite is preferred because the pore size is small and its specific surface area is large. However, in the case of a fat or oil, when the size of the molecule is about 40 Å or so, for example, the pore size of the Y-type zeolite is roughly 10 Å at the largest, and the catalyst action of the zeolite that effectively acts is limited to an outer surface of the catalyst particles at an initial stage of cracking. However, if many metals are supported to fill ultrafine metal catalyst particles in the pores, the hydrogen quickly penetrates into the pores (pore inlet is in a gas phase because of the presence of a gaseous cracking gas), so that the hydrogen is dissociated by the metal catalyst, thereby generating a large amount of active hydrogens. A platinum group metal is useful in the dissociation of the hydrogen, and nickel transmits active, spilled over hydrogen. The acid sites of the cracking activity sites of the zeolite produces a heavy hydrocarbon species (carbon) by the polymerization or the like during the hydrocarbon cracking reaction, thereby losing activity; however, the regeneration is repeated by active, spilled over hydrogens, whereby consequently suppressing the precipitation of the carbon. In addition, since the active, spilled over hydrogens are accepted in a Brønsted acid of the solid acid (The Japan Society of Adsorption, *Adsorption News* 25(2) (July 2011), H. Hattori; *Shokubai* (*Catalyst*) 45, 327 (2003)), it is assumed that the active, spilled over hydrogens are transmitted to an outer surface from the internal of the zeolite. As a whole, cracking and hydrogenation of the fat or oil are accelerated on the surface of the zeolite particles. Since the active hydrogens are supplied in a large amount from the internal of the zeolite particles to the surface, the formation of carbon which is caused by deficiency of hydrogen due to cracking is suppressed. Thus, the carbon formation is suppressed even with a low-pressure hydrogen of 1 Mpa or less, so that the catalyst function is efficiently exhibited.

According to a chemical engineering consideration, the catalyst particle surface is coated with a liquid film, so that the hydrogens need to be dissolved in the liquid, and the dissolved hydrogens need to diffuse to reach to a metal catalyst. Since the solubility of hydrogens is very low, it is resistive to the mobility of the hydrogens, so that high-pressure hydrogens would be needed. The hydrocracking catalyst in the present invention reaches to a metal catalyst through acid sites from the internal of the pores, so that it can be assumed that the hydrogens are sufficiently supplied even under a normal pressure.

However, a means for supporting a large amount of metal particles inside the pores of zeolite or the like has not been conventionally known. The present inventors have intensively studied in order to realize the catalyst structure from the above assumptions and considerations. As a result, the present inventors have arrived at the invention of a novel method for preparing a catalyst.

The sulfur compound used in the present invention includes one or more members selected from the group consisting of thiourea, N,N'-diethylthiourea, and thioacetamide.

In the step 2, a solid product obtained in the step 1 and at least one metal component are stirred in an aqueous medium to allow liquid-solid separation.

For example, to 100 g of distilled water are applied a solid product obtained in the step 1 in an amount of preferably from 5 to 30 g, and more preferably from 10 to 20 g, and a metal component in an amount of preferably from 0.2 to 5.0 g, and more preferably from 0.3 to 3.0 g, and these components are stirred at an ambient temperature (for example, from 15° to 25° C.). The stirring time is preferably from 2 to 8 hours, and more preferably from 4 to 8 hours. Next, the mixture is subjected to liquid-solid separation by a conventional method to recover a solid product. During the liquid-solid separation, a solid product may be washed with water plural times. When a plurality of metals are applied, the metal components may be mixed and applied, or one of the metal components may be subjected to stirring and liquid-solid separation, and thereafter another metal component may be subjected to stirring and liquid-solid separation.

It is preferable that the metal component is one or more metals selected from platinum, ruthenium, palladium, iridium, nickel, iron, cobalt, molybdenum, rhenium, copper, and magnesium. In the case of a fat or oil raw material, copper is effectively added in cracking and hydrogenation of the ester moiety. Cu also provides the property of an alkali metal, thereby showing the effects of a decarboxylation reaction, and water is generated by deoxygenation by the effects of a reduction-oxidation reaction of Cu, thereby contributing to the cracking of the ester moiety. Therefore, it is recommended to add Cu. In addition, since magnesium oxide is effective by taking the decarboxylation reaction with an alkali catalyst into consideration, it is recommended to add magnesium. Further, when a sulfurization treatment is carried out after reduction in the step 4, it is preferable to add molybdenum. Therefore, nickel and ruthenium, which is inexpensive among precious metals, and a composite with copper or magnesium are even more preferred in functionality and economic advantages, and it is still even more preferably to use molybdenum.

In the step 3, a solid product obtained in the step 2 is baked. It is preferable that the baking of a solid product includes first baking in hydrogen (gas), and then baking in the air.

A solid product obtained in the step 2 is dried, and a dried product is heat-treated at a temperature of preferably from 150° to 300° C. in a hydrogen gas. A more preferred temperature is from 200° to 250° C. It is preferable that the heat-treatment time in this hydrogen gas is from 1 to 5 hours. After a certain time, a heat-treated product is baked in the air at a temperature of preferably from 300° to 500° C. A more preferred temperature is from 350° to 450° C. It is preferable that the heat-treatment time in this air is from 1 to 5 hours.

The assumed mechanisms for the baking step described above are as follows.

Metal ions are metalized by heat treatment under hydrogen, so that a sulfur component becomes sulfur particles. The both provide a mixture atomic cluster particles. By baking in the air, an organic product is cracked and scattered, and the sulfur particles are converted to $SO_2$ and scattered, thereby producing ultrafine particles of the metal catalyst component having voids of cluster sizes. In the heat treatment at a temperature exceeding 500° C. in the air, since the temperature exceeds one-third of the temperature of the metal melting point, aggregation is highly likely to take place by thermal diffusion in many cases, and the voids of the above cluster sizes are likely to undesirably disappear.

Raney nickel-type catalyst particles having the voids have their particles sizes in a size of a zeolite pore size even when aggregated, and the particle sizes are as large as 10 Å or less, so that the specific surface area of the metal particles are kept large.

In the step 4, a solid product obtained in the step 3 is reduced. The reduction of the solid product can be accomplished by heating in the presence of hydrogen (gas).

The temperature during the heating is, as in the same manner as the case of the above baking in the air, preferably 500° C. or lower, and more preferably 450° C. or lower. On the other hand, the lower limit of the heating temperature is preferably 250° C., and more preferably 300° C. The treatment time is preferably from 1 to 5 hours.

Alternatively, one option of the step 4 includes reducing a solid product obtained in the step 3, and then subjecting a reduced product to a sulfurization treatment. Preferred reducing conditions of a solid product in this case are the same as mentioned above. By the sulfurization treatment described above, it is preferable because it is made possible to lengthen the life of the catalyst.

The sulfurization treatment of a solid product after the reducing treatment can be carried out by, for example, contacting a solid product with a hydrogen sulfide-containing hydrogen, and concretely, a solid product is heat-treated in a hydrogen gas containing preferably from 1 to 5% by volume of hydrogen sulfide at a temperature of preferably from 300° to 400° C. It is preferable that the treatment time for the sulfurization treatment is from 1 to 3 hours. The flow rate of the gas is, for example, preferably from 1 to 10 NL/hour.

The assumed mechanisms for the steps 1 to 4 as used herein are as follows.

With the degradation, the modification (isomerization, dehydrogenation or the like) of the raw material components, carbon substances are accumulated in zeolite acid sites, thereby lowering their activities. The causations therefor are in active hydrogen deficiency, and causations for the deficiencies are in that metals generating active hydrogens cause aggregation by heating (sintering), so that surface areas become smaller, and the ability to generate active hydrogens is abated. Therefore, in order to prevent the catalyst activity from lowering, the countermeasures of the roots are to remove the root causations, specifically, to allow the ultrafine metal particles to be present in a large amount as described in detail hereinbelow, and/or not to allow aggregation of the ultrafine metal particles.

(1) Method for Allowing Ultrafine Metal Particles to Be Present in Large Amount at High Dispersion In a known metal ion impregnation method, it is made difficult to have a large supporting amount if purposed for high dispersion, so that a supporting amount of metal of 1% by mass or so or less is suitable (the above Non-Patent Publication 3). In the above method according to the present invention, it is made possible to make a supporting amount large at high dispersion, so that the supporting amount of metal can be preferably from 3 to 30% by mass. In the present invention, the supporting amount of metal in the hydrocracking catalyst is more preferably from 3 to 25% by mass, and even more preferably from 5 to 20% by mass. The supporting amount can be set to a desired range by, for example, properly adjusting an amount of a metal component applied in the step 2. When the metal components are in plurality, the supporting amount of metals would be a total amount of each metal component.

Here, it is possible to support a complex metal ion (for example, metal ammine complex ion or the like) according to ion-exchanging method, but the steps are complicated, thereby making it economically disadvantageous. Moreover, it is impossible to produce ultrafine metal particles having voids of the above cluster size therewith.

(2) Method for Preventing Aggregation of Ultrafine Metal Particles

By baking in the air in the step 2, a previous sulfur compound is degraded by oxidation, so that sulfur is scattered as sulfur dioxide. As a result, voids of cluster sizes are formed after the sulfur particles are scattered. If molybdenum is previously added as a metal component, ultrafine molybdenum particles are also present. If a sulfurization treatment is carried out before the use in hydrocracking reaction, molybdenum having great affinity with sulfur forms molybdenum sulfide $MoS_2$, so that molybdenum sulfide can be present at voids of the cluster size. This $MoS_2$ is present in the internal of the metal nanoparticle population, which is assumed to serve as a wedge for inhibiting the aggregation of the metals themselves. Moreover, since the metal nanoparticle population is present within the internal region of zeolite having a size of nanosize or smaller, the metal particles would not grow to a size of 1 nano or greater even when the aggregation is progressed, so that the deterioration of the metal properties is not caused. In other words, the ability of generating active hydrogens is kept at a constant level.

However, as a result of continuation of hydrocracking reaction for a long period of time, when carbons are gradually accumulated and the hydrocracking reaction efficiency is lowered to an unacceptable level, the removal of carbons would be necessitated. When the removal of carbons is carried out from the catalyst, it is recommended that removal by oxidation is carried out with the air or the like. By carrying out the removal by oxidation, molybdenum in the voids of the cluster size becomes $MoO_3$ with desulfurization and oxidation, and it is considered that $MoS_2$ is again regenerated by the treatment with hydrogen sulfide/hydrogen gas. Therefore, the hydrocracking catalyst in the present invention has excellent usefulness that enables regeneration procedures of the catalyst capable of removing carbons while suppressing the aggregation of the fine metal particles.

The analysis of the elemental dispersion in the particles can be performed by ICP emission analysis or the like, and it is also possible to analyze adopting a more convenient analytical method.

The hydrocracking catalyst in the present invention is a catalyst that can meet to a fuel modification reaction (degradation, dehydrogenation, isomerization, cyclization reaction) of the biomass retort oil without having an ester moiety and hydrocarbons in the petroleum oil. Therefore, the catalyst in the present invention can be widely applied as a fuel modification catalyst of hydrocarbons in not only fats and oils raw materials, but also biomass raw materials or further petroleum oils.

It is assumed that the hydrocracking catalyst in the present invention has a structure that metal particles are supported not only on a supporting surface but also in an internal of the support, using a cracking catalyst as the support. Therefore, when the specific surface area of the hydrocracking catalyst is compared with the specific surface area of the cracking catalyst before metal particles are supported, the former is smaller. Therefore, one embodiment of the hydrocracking catalyst in the present invention is in that a ratio of the specific surface area of the hydrocracking catalyst to the specific surface area of the cracking catalyst before metal particles are supported (specifically, [specific surface area ($m^2$/g) of hydrocracking catalyst]/[specific surface area ($m^2$/g) of cracking catalyst before metal particles are supported]) is preferably from 0.50 to 0.95, and more preferably from 0.55 to 0.85. It can be said that as this ratio becomes smaller, a larger amount of the metal particles is supported. The specific surface areas of the hydrocracking catalyst and the cracking catalyst can be obtained utilizing BET method described in Examples.

The BET specific surface area of the hydrocracking catalyst in the present invention is, for example, preferably 150 $m^2$/g or more, more preferably 250 $m^2$/g or more, and even more preferably 400 $m^2$/g or more, and preferably 1,200 $m^2$/g or less, more preferably 1,000 $m^2$/g or less, and even more preferably 800 $m^2$/g or less.

One of the features of the present invention is in the aspect that the invention can be carried out at relatively low costs. While there are some ideas of directly applying the techniques based on petroleum oil raw materials to various raw material oils of the fields of the present invention, there are some setbacks in accepting economically the use of an expensive precious metal such as platinum in a catalyst or the use of high-pressure hydrogen or the like, because locally produced and consumed-type fuel production apparatus is important, particularly when biomass raw material is subject. In actual situations, it is understood as presupposition that the hydrocracking is carried out by the use of high-temperature, high-pressure hydrogen, and it is the technical common knowledge that the hydrocracking has been accomplished under the assumptions of the technical idea mentioned above. Therefore, it is considered that the catalyst in the present invention gives great influences in lowering the pressure of the processes and reasonableness.

3. Hydrocarbon Liquid Fuel and Apparatus for Producing Hydrocarbon Liquid Fuel

The hydrocarbon liquid fuel of the present invention is characterized in that a hydrocarbon liquid fuel is produced by a method for producing a hydrocarbon liquid fuel of the present invention. The hydrocarbon liquid fuel obtained is a mixture of hydrocarbons equivalent to a gas oil or kerosene, from the viewpoint of boiling points and the number of carbon atoms, which is highly valuable as a fuel.

The apparatus for producing a hydrocarbon liquid fuel of the present invention is an apparatus for producing a hydrocarbon liquid fuel including hydrocracking a raw material oil, the apparatus including a raw material oil feeding means, a hydrogen gas feeding means, and a means of regulating a flow rate of a raw material oil and a flow rate of a hydrogen gas, and further including a reaction member in which a supplied raw material oil and a supplied hydrogen gas are reacted in the presence of a hydrocracking catalyst. Further, it is preferable that the apparatus for producing a hydrocarbon liquid fuel of the present invention optionally includes a hydrogen gas production apparatus or a reaction product separation apparatus for distilling and separating a reaction-terminated product, or the like.

The apparatus for producing a hydrocarbon liquid fuel of the present invention will be described hereinafter more specifically referring to FIG. 3.

The apparatus of the present invention comprises at least three members: (1) feeding members for a raw material oil and a hydrogen gas, (2) a reaction member, and (3) a reaction product collecting member. In (1) the feeding members for a raw material oil a hydrogen gas, a raw material oil is fed from a line 1 to an upper part of a reaction tube 7 through a liquid feeding pump 2, and hydrogen is fed from a line 3 to an upper part of a reaction tube 7 (preferably downstream of the site at which the raw material oil is fed) through a regulating unit 4 for a flow rate of a hydrogen gas. In (2) the reaction member, a reaction tube 7 in which a thermometer 5 is set in a center of the internal is heated and temperature-controlled with an electric heating furnace 8 equipped with a thermometer 6. In (3) the reaction product collecting member, a gas-liquid mixture discharged from a lower part of a reaction tube 7 is cooled with a condenser 9, and then led to a gas-liquid separation apparatus 10. In a condensate receiver 11, water is mainly collected. The produced hydrocarbons and unreacted products are accumulated in a condensate receiver 12 equipped with a cooling function. An unreacted hydrogen gas and a gaseous hydrocarbon are discharged from the condensate receiver 12 (the gaseous hydrocarbon being separated from a hydrogen gas in a separate apparatus, and used as a fuel or the like). The content of the condensate receiver 12 is separated with a different distillation apparatus to the hydrocarbons equivalent and a gas oil or kerosene from the unreacted products (high-boiling point products).

In a reaction member of the apparatus for producing a hydrocarbon liquid fuel of the present invention, a hydrocracking catalyst produced by a method including the above steps 1 to 4 is present. By the presence of the catalyst, a hydrocarbon liquid fuel equivalent to a gas oil or kerosene can be easily produced even when a hydrogen gas is supplied at a low-pressure supplying pressure of from 0.1 to 1.0 MPa.

The hydrogen gas production apparatus includes, for example, a steam modification reaction apparatus comprising a feeding member for a low-boiling point, gaseous product recycled raw material separated from a reaction product in the apparatus for producing a hydrocarbon liquid fuel of the present invention, or a manufactured gas feeding member (e.g., a facility comprising a ruthenium-alumina catalyst).

As the reaction product separation apparatus for separating a reaction product, for example, a normal pressure or reduced pressure distillation tower can be employed. A low-boiling point gaseous material is recycled to the hydrogen gas production apparatus. Also, in a case where it is desired to have a larger amount of a kerosene equivalent portion, the gas oil equivalent portion may be recycled and fed to the hydrocracking apparatus, and converted to a kerosene equivalent portion.

High-boiling point substances discharged from a reaction product separation apparatus, i.e., a lower part of the distillation tower, are collected as a fuel for combustion, which may be fed to combustion or energy collecting apparatus for utilizing as heat sources necessary for an overall apparatus.

EXAMPLES

The present invention will be described more specifically hereinbelow on the bases of Examples and the like, without intending to limit the present invention to those Examples and the like.

Here, the details of the materials used in the following Examples and the like are as follows.

Zeolite (Y-type zeolite, trade name: 360HUDIA, manufactured by Tosoh Corporation, particle size: pulverized product being 250 to 600 μm)

Nickel nitrate (nickel(II) nitrate hexahydrate, manufactured by Wako Pure Chemical Industries, Ltd.)

Ruthenium nitrate (trade name: trinitranitrosylruthenium (II) nitric acid solution, manufactured by Wako Pure Chemicals Industries, Ltd.)

[Preparation of Catalysts]

Production Example 1

For the purpose of filling large amounts of metals in pores of zeolite, 9 parts by mass of Ni and 3 parts by mass of Ru (a total being 12 parts by mass), based on 100 parts by mass of zeolite, were contained.

[Addition of Thiourea]

The thiourea treatment of zeolite was carried out by the following procedures.

Fifteen grams of zeolite was furnished. Separately, 7.0 g of thiourea was dissolved in 100 g of distilled water. Next, both the components were fed in a 300 mL eggplant-shaped flask.

An evaporator was attached with this eggplant-shaped flask, and the contents were stirred at an ambient temperature for 24 hours (subjected to a reduced pressure treatment 10 times or so during mixing while stirring). After the termination of stirring, the contents were subjected to a liquid-solid separation, and a solid product obtained was washed with 100 g of distilled water. Further, the procedures of liquid-solid separation and washing with water were repeated three times, to give a powder. A mixture in which 100 g of distilled water was added to a powder obtained was named a.

The metal treatment of zeolite was carried out by the following procedures.

[Addition of Ruthenium]

The amount 2.7 g of a nitrate solution of $N_4O_{10}Ru$ (concentration: 52%) (0.45 g, calculated as Ru) was diluted with 25 g of distilled water. Next, an entire amount of the above a (solid product being 22.0 g) and this ruthenium solution were mixed, and the mixture was stirred with an evaporator at an ambient temperature for 4 hours. Thereafter, the liquid-solid separation and the washing with water were repeated in the same manner as described above, to give a powder. A mixture in which 100 g of distilled water was added to a powder obtained was named b.

[Addition of Nickel]

The amount 6.6 g of $Ni(NO_3)_2 \cdot 6H_2O$ (1.32 g, calculated as Ni) was dissolved in 25 g of distilled water. Next, an entire amount of the above b (solid product being 22.45 g) and this nickel solution were mixed, and the mixture was stirred with an evaporator at an ambient temperature for 4 hours. Thereafter, the liquid-solid separation and the washing with water were repeated in the same manner as described above, to give a powder, which was named c.

The finishing of the catalyst was carried out by the following procedures.

[Air-Drying]

c was spread on a filter paper, and air-dried over a period of 24 hours. A powder obtained was named d.

[Filling of Reaction Tube]

The above d was filled in a 20 cc reaction tube. A reaction tube after the filling was named e.

[Hydrogen Ventilation and Baking]

The above e was subjected to hydrogen ventilation for 4 hours. During the ventilation, the reaction tube was heated to 200° C. A reaction tube after heating was named f.

[Air Ventilation and Baking]

The above f was subjected to air ventilation for 4 hours. During the ventilation, the reaction tube was heated to 400° C. A reaction tube after heating was named g.

[Hydrogen Ventilation and Reduction]

The above g was subjected to hydrogen ventilation for 4 hours. During the ventilation, the reaction tube was heated to 350° C. A reaction tube after heating was named h, and the powder was taken out of the reaction tube h, to give a catalyst A.

Comparative Example 1

The same procedures as in Production Example 1 were carried out except that the thiourea treatment was not carried out. Specifically, the following procedures were carried out in the same manner as in Production Example 1, assuming that an aqueous slurry of zeolite having a concentration of 15% by mass corresponds to a in Production Example 1, to prepare a catalyst B.

[Analysis of Catalysts]

To what extent a metal was filled in the pores of the zeolite in the above catalyst A and catalyst B was analyzed as follows.

With respect to the each of catalyst A, the catalyst B, and the zeolite used in the production of the catalysts, the BET specific surface area and the distributions of the pores were measured using ASAP2020 manufactured by Micrometrics. Each of the specific surface areas was shown in Table 1, and the graphs showing the distributions of the pores were shown FIG. 1 and FIG. 2. Here, in FIG. 1 and FIG. 2, the distribution of the pores of the zeolite is shown by solid line, and the distributions of the catalyst A (Production Example 1) and the catalyst B (Comparative Example 1) were shown by solid line[sic].

TABLE 1

| | Specific Surface Area $(m^2/g)$ |
|---|---|
| Catalyst A | 484 |
| Catalyst B | 621 |
| Zeolite | 628 |

It could be seen that the specific surface area of the catalyst A was 484 $m^2/g$, which was lowered as compared to 628 $m^2/g$ of the zeolite. Specifically, [specific surface area (m²/g) of the hydrocracking catalyst]/[specific surface area (m²/g) of the cracking catalyst before supporting the metal particles]=0.77. Further, it was confirmed from FIG. 1 that the pores were reduced in the catalyst A.

From the reduction in the specific surface area of the above pores, to what level of volume a metal was filling the pores was geometrically roughly calculated as described hereinbelow.

Suppose that a pore radius of a blank is R, and reduced to a pore radius r by evenly covering the walls of the pores by supporting a metal. If L is a length of pores, a ratio of specific surface areas, i.e., $2\pi L/2\pi RL=484/628=$about 0.77, so that r=0.77R.

The ratio of the pore volumes, i.e., $\pi r^2 L/\pi R^2 L = (r/R)^2 = 0.77^2 = $about 0.59.

In other words, in calculation, 40% by volume of the pore volume of the catalyst A is occupied by the metal.

If 40% of the pore volume is occupied by the metal, the supporting amount by % of the metal is calculated from the pore volume and the apparent specific gravity of the metal as shown in Table 2.

TABLE 2

| Pore Volume | Specific Gravity of Metal | | |
|---|---|---|---|
| (cm³/g) | 1 | 2 | 3 |
| 0.6 | 24% | 48% | 96% |
| 0.4 | 16% | 32% | 64% |
| 0.2 | 8% | 16% | 24% |

As to the total supporting amount of the metal, an external ratio was 12% by mass.

According to the above Table 2, inconsistencies are not found under the conditions of a pore volume of from 0.2 to 0.4 cm³/g and a specific gravity of a metal of from 1 to 2 (This is because when the metal is porous, its specific gravity can also be from 1 to 2.).

As such, according to the analyses described above, roughly 40% of the pore volume of the catalyst A is occupied by a metal. In other words, the filling of a metal into pores was accomplished to a level originally projected.

Figure 2:
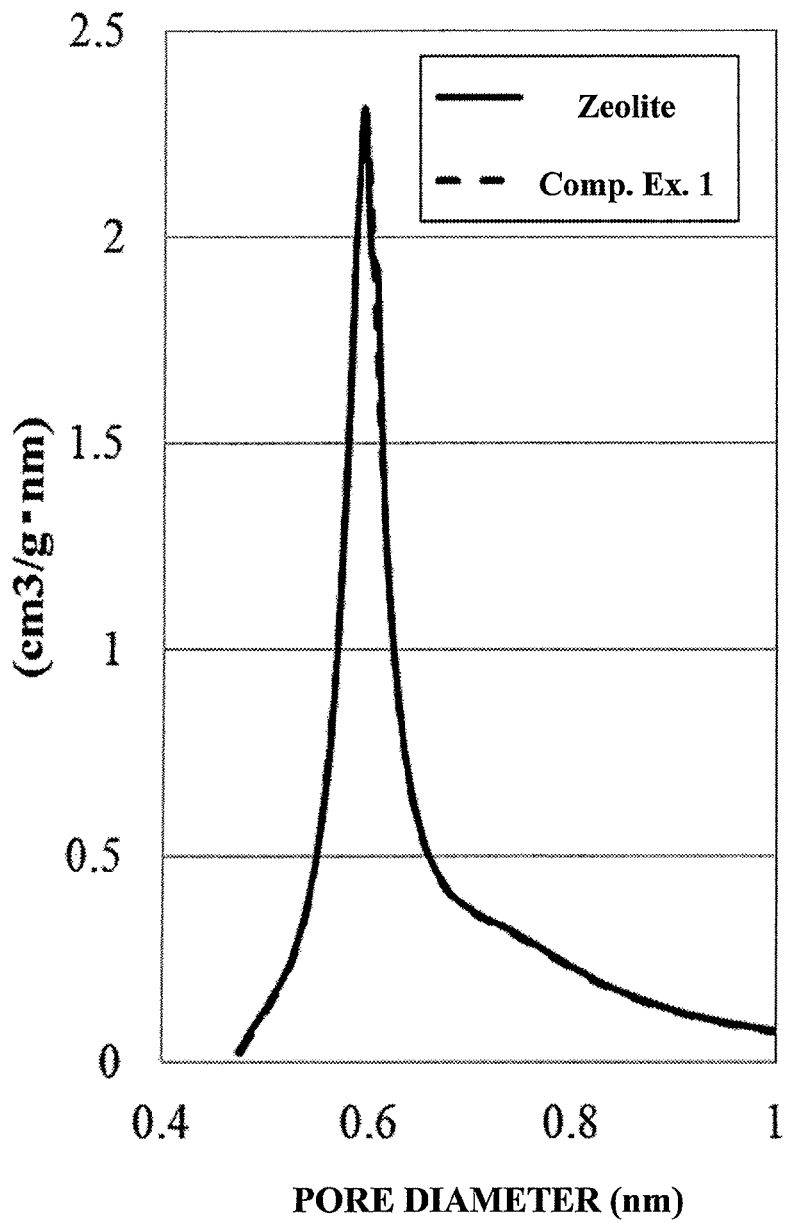
FIG. 2 is a graph showing the distributions of pores of Catalyst B and zeolite.

Next, the pore distributions shown in FIG. 1 and FIG. 2 were studied.

It could be seen from FIG. 1 that in the catalyst A the pores are reduced as compared to a case of the zeolite alone. The reduced portion corresponded to an integral of a difference of the distribution curves, which was said to clearly be a significant amount. In other words, it could be seen from FIG. 1 that in the catalyst A the metal was succeeded in penetration (supporting) within the pores as intended.

On the other hand, when the catalyst B was studied, from Table 1, the specific surface area of the catalyst B obtained of Comparative Example 1 was 621 m²/g, hardly showing any differences as compared to 628 m²/g of the zeolite. Further, from FIG. 2 the pore distribution of the zeolite and that of the catalyst B (Comparative Example 1) were nearly the same, from which it was shown that the metal was hardly penetrated (supported) in the pores of the catalyst B. Therefore, it was suggested that the pores of the catalyst B hardly penetrated (supported) the metal.

From the analyses, it was made possible to understand the Ni metal in a large amount of addition. On the other hand, it was clarified in the method of Comparative Example 1 that it is difficult to support the metal to the pores of the zeolite. It could be assumed that in the catalyst B, even if the metal could be penetrated (supported), it is limited to very near the inlet of the pores because the pores of the zeolite are too small.

Further, with respect to each of the catalyst A, the catalyst B, and the zeolite used in the production of the catalysts, the elemental analysis of the surfaces of those particles was conducted. Since it was assumed that in the catalyst A Ni and Ru were sufficiently penetrated in the pores as mentioned above, whether or not the influences reflected in the values of surface elemental analysis was studied by this analysis.

In both Production Example 1 and Comparative Example 1, at a final stage liquid-solid separation was carried out, so that it was considered that the metal physically adsorbed to a surface was washed away.

Here, if Ru added in a small amount was remarked, in the catalyst A obtained in Production Example 1, it was confirmed from the results of elemental analysis that Ru was present in an amount of 0.37%. On the other hand, in the catalyst B obtained in Comparative Example 1, it could be seen from the results of elemental analysis that Ru was only present in an amount of 0.09%, which showed that the chemically adsorbed amount by which Ru was penetrated (supported) took place in the pores in the internal very near the surface of the zeolite. Also, it was observed that the chemically adsorbed amount was 4 times that of 0.09%, the value of the surface elemental analysis of the physically adsorbed amount of Comparative Example 1.

As such, it can be seen that since Ru is detected more in Production Example 1 than Comparative Example 1, the metal is supported within the pores of the internal of the zeolite.

[Reaction Results]

Example 1

Figure 3:
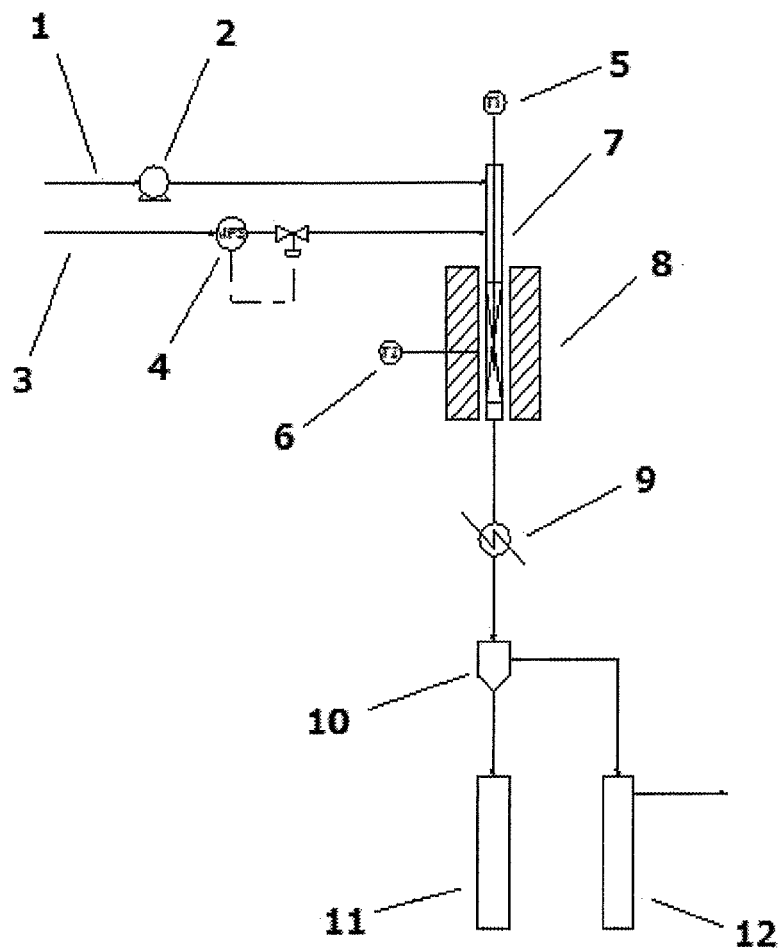
FIG. 3 is a schematic view of an apparatus for producing a hydrocarbon liquid fuel of the present invention.

Using a fixed bed circulation-type reaction apparatus at a normal pressure with a constitution as shown in FIG. 3 as an apparatus for producing a hydrocarbon liquid fuel, an internal of a reaction tube 7 was filled with a catalyst (20 cc), and a hydrocracking reaction of fats and oils was carried out in a single-step reaction. A reaction tube 7 having an inner diameter of 10.22 mm and a length in which the catalyst was filled of 244 mm was used as a reactor, and a thermocouple was set at a center in a catalyst layer to measure a temperature of the catalyst layer.

The reactor was temperature-controlled with an electric heating furnace 8, a reaction product was cooled with an ambient temperature water chiller, and a condensed component was then separated. Liquid components collected in a condensed product receiver (hydrocarbons) 12 were subjected to gas chromatography analysis. The hydrogen flow rate was controlled with a flow rate controlling valve. The fats and oils, which were the raw material oils, were fed with a metering liquid pump.

The reaction conditions were as follows.
Raw materials: a commercially available edible rapeseed oil (SHOWA Canola Oil)
Catalyst: zeolite 330, 3% by mass of Ni, 1% by mass of Ru, and 1% by mass of Cu (particle sizes: 250 to 600 μm)

As to the catalyst, as shown in Production Example 1, it could be confirmed that the metal catalyst can be filled within the pores of the zeolite in an external ratio of up to 12% by mass. Therefore, taking the balance between the cracking ability of the carbon chain and the hydrogenation ability of the zeolite into consideration, the same procedures as in Production Example 1 were carried out by designing a catalyst so that the metal catalyst can be sufficiently filled within the pores in an external ratio of 3% by mass of Ni, 1% by mass of Ru, and 1% by mass of copper in order to expect further optimization.

Reaction temperature: 450° C.

Supplying pressure of hydrogen (gas): normal pressure (0.102 MPa)

LHSV=1.85 (feeding rate of raw material oil L/Hr/catalyst L)

Flow rate of raw material oil: 37 milliliters/Hr

Flow rate of hydrogen: 7,200 normal milliliters/Hr (In other words, a flow rate of a hydrogen gas was 194.6 NL, per 1 L of raw material oil.)

The yield of the hydrocarbons of the condensed component of the reaction product (distillation and separation of the reaction product) was 77% by mass, calculated as hydrocarbons (a product equivalent to kerosene or gas oil). The remaining 23% by mass was high-boiling point residues and deposition losses. Here, in the aggregated product after the reaction, several percent by volume of water was observed, so that the aggregated product was separated into layers (The interface was indefinite so that the measurement could not be made quantitatively. Only obvious water was separated.). This water is produced by hydrogenating oxygen at an ester site of the fats and oils by cracking, to be converted to water. As described above, according to the method of the present invention, the hydrocracking of the fats and oils was accomplished with hydrogen at a normal pressure.

Figure 4:
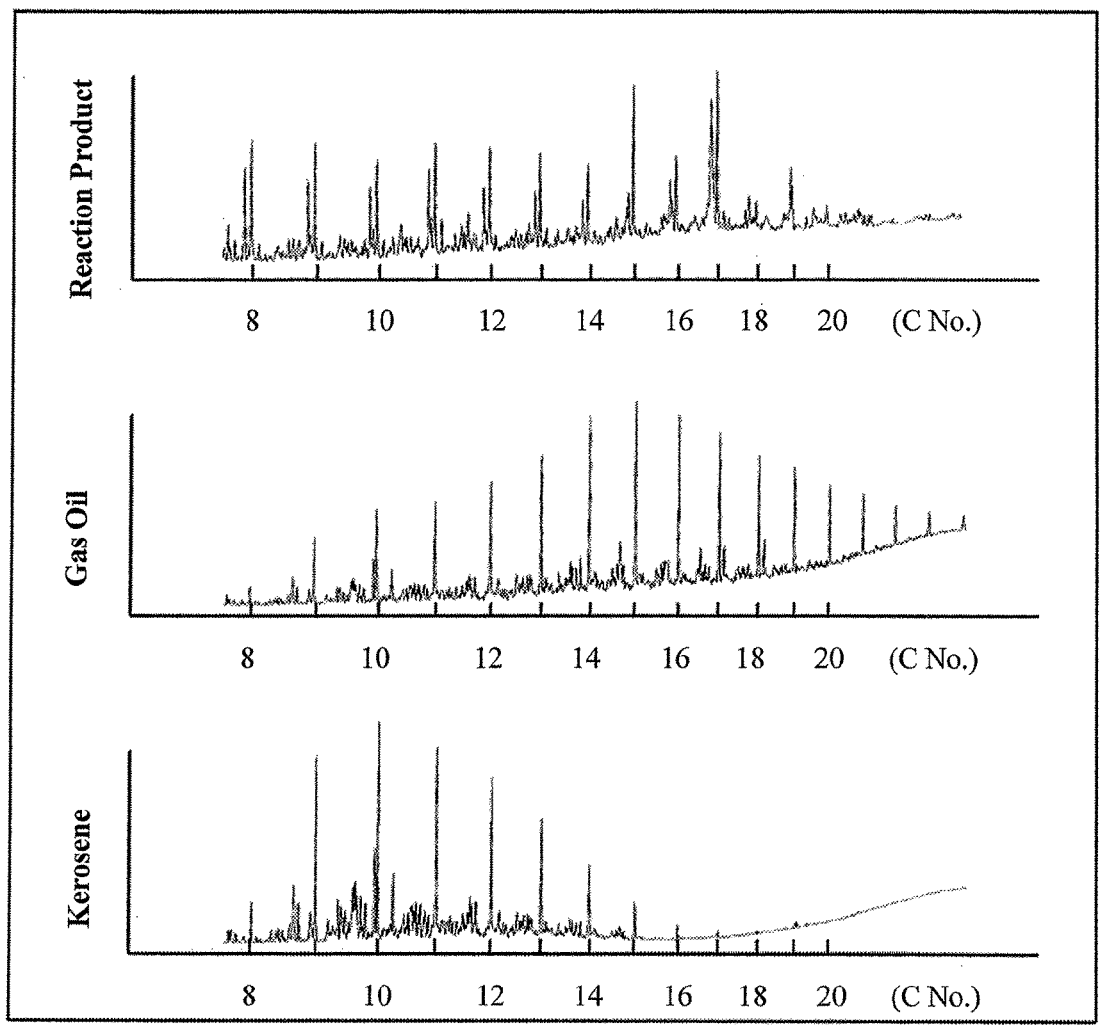
FIG. 4 is chromatograms of a condensed component of a reaction product.

Next, the condensed component of a reaction product was subjected to gas chromatography analysis. The results are shown in FIG. 4. It could be seen from the results that the condensed component obtained was hydrocarbons corresponding to a mixture of kerosene and a gas oil. In other words, it could be confirmed that the cracking of the carbon chains was progressed.

In this catalyst, the production of carbon accompanying cracking was suppressed even under hydrogen at a normal pressure without deterioration of the catalyst, thereby making it possible to conduct continuous steady operations (In other words, in the reaction test, 8-hour continuous operations could be accomplished. During the reaction, the supplying pressure of hydrogen did not fluctuate, so that there were no changes in ventilation resistance of the catalyst layer due to the production of carbon. After the termination of the reaction, the catalyst was taken out and the observations were made. As a result, the particle fusion due to carbon was not observed at all, and the catalyst kept the original shape of particles.).

It is possible to directly use the condensed component as a fuel. Further, the reaction conditions (temperature, LHSV, hydrogen feeding rate, pressure of 1 MPa or less, and the like) and the catalyst preparation (molybdenum addition and sulfurization treatment) are optimized, so that in addition to the number of carbon atoms, the properties can be made closer to those of gas oil and kerosene, whereby an industrially lengthened life of the catalyst can be accomplished. If distilled, a product equivalent to kerosene and a product equivalent to a gas oil are separately obtained.

INDUSTRIAL APPLICABILITY

The hydrocarbon liquid fuel obtained by the method of the present invention can be suitably used as a fuel equivalent to a gas oil or a fuel equivalent to kerosene.

EXPLANATION OF NUMERALS

1 Line
2 Liquid feeding pump
3 Line
4 Hydrogen gas flow rate regulating unit
5 Thermometer
6 Thermometer
7 Reaction tube
8 Electric heating furnace
9 Condenser
10 Gas-liquid separation apparatus
11 Condensed product receiver (water)
12 Condensed product receiver (hydrocarbons)

The invention claimed is:

1. A method for producing a hydrocarbon liquid fuel comprising hydrocracking a raw material oil in the presence of a hydrocracking catalyst,
    at a supplying pressure of hydrogen of from 0.1 to 1.0 MPa,
    a liquid space velocity of liquid volume of the raw material oil of from 0.05 to 10.0 $hr^{-1}$, and
    a ratio of a flow rate of the hydrogen to a flow rate of the raw material oil of from 50 to 3,000 NL of the hydrogen per 1 L of the raw material oil,
    wherein the hydrocracking catalyst is produced by a method comprising
        stirring one or more sulfur compounds selected from the group consisting of thiourea, N,N'-diethylthiourea, and thioacetamide, and a cracking catalyst in an aqueous medium to allow liquid-solid separation (step 1);
        stirring a solid product obtained in the step 1 and at least one metal component in an aqueous medium to allow liquid-solid separation (step 2);
        baking a solid product obtained in the step 2 (step 3); and
        reducing a solid product obtained in the step 3, or reducing a solid product obtained in the step 3, and then subjecting a reduced product to sulfurization treatment (step 4).

2. The method for producing a hydrocarbon liquid fuel according to claim 1, wherein the raw material oil is one or more members selected from the group consisting of rapeseed oil, cottonseed oil, palm oil, coconut oil, sunflower oil, soybean oil, rice oil, oil palm oil, coconut oil, Jatropha oil, olive oil, waste cooking oils, dark oils, animal oils, biomass retort oils, gas oils or a hydrocarbon component in petroleum oil, having the number of carbon atoms larger than gas oil, and various waste oils.

3. The method for producing a hydrocarbon liquid fuel according to claim 1, wherein the cracking catalyst is one or more solid acids selected from the group consisting of silica, silica-alumina, zeolite, silica-zirconia, alumina-zirconia, and titania.

4. The method for producing a hydrocarbon liquid fuel according to claim 1, wherein the metal is one or more members selected from the group consisting of platinum, ruthenium, palladium, iridium, nickel, iron, cobalt, molybdenum, rhenium, copper, and magnesium.

5. A hydrocarbon liquid fuel produced by a method for producing a hydrocarbon liquid fuel as defined in claim 1.

6. An apparatus for producing a hydrocarbon liquid fuel comprising hydrocracking a raw material oil, comprising at least raw material oil and hydrogen gas feeding members, a reaction member, and a reaction product collecting member,
    wherein in the reaction member is present a hydrocracking catalyst produced by a method comprising:
        stirring one or more sulfur compounds selected from the group consisting of thiourea, N,N'-diethylthiourea, and thioacetamide, and a cracking catalyst in an aqueous medium to allow liquid-solid separation (step 1);
stirring a solid product obtained in the step 1 and at least one metal component in an aqueous medium to allow liquid-solid separation (step 2);
baking a solid product obtained in the step 2 (step 3); and
reducing a solid product obtained in the step 3, or reducing a solid product obtained in the step 3, and then subjecting a reduced product to sulfurization treatment (step 4).

\* \* \* \* \*